United States Patent
Leonard et al.

(10) Patent No.: US 7,009,519 B2
(45) Date of Patent: Mar. 7, 2006

(54) PRODUCT DISPENSING CONTROLLED BY RFID TAGS

(75) Inventors: Stephen B. Leonard, Franksville, WI (US); James F. Kimball, Hales Corners, WI (US)

(73) Assignee: S.C. Johnson & Sons, Inc., Racine, WI (US)

( * ) Notice: Subject to any disclaimer, the term of this patent is extended or adjusted under 35 U.S.C. 154(b) by 111 days.

(21) Appl. No.: 10/718,886

(22) Filed: Nov. 21, 2003

(65) Prior Publication Data

US 2004/0124988 A1   Jul. 1, 2004

Related U.S. Application Data

(60) Provisional application No. 60/427,934, filed on Nov. 21, 2002, provisional application No. 60/430,101, filed on Dec. 2, 2002, provisional application No. 60/430,102, filed on Dec. 2, 2002, provisional application No. 60/482,867, filed on Jun. 27, 2003.

(51) Int. Cl.
G08B 13/14   (2006.01)

(52) U.S. Cl. .................... 340/572.8; 235/375; 340/505

(58) Field of Classification Search .............. 340/5.61, 340/505, 572.1, 572.8; 235/375–384
See application file for complete search history.

(56) References Cited

U.S. PATENT DOCUMENTS

| | | |
|---|---|---|
| 3,144,174 A | 8/1964 | Abplanalp |
| 3,518,410 A | 6/1970 | Dillarstone |
| 3,578,945 A | 5/1971 | Ayres |
| 3,644,707 A | 2/1972 | Costello |
| 3,824,364 A | 7/1974 | Cachat |
| 3,862,616 A | 1/1975 | Brady |
| 3,997,083 A | 12/1976 | McNair |
| 4,013,742 A | 3/1977 | Lang |
| 4,055,391 A | 10/1977 | Schmidt et al. |
| 4,374,571 A | 2/1983 | Hirvela |
| 4,444,720 A | 4/1984 | Mayer |
| 4,499,355 A | 2/1985 | Walter |
| 4,667,846 A | 5/1987 | Marceau |
| 4,695,434 A | 9/1987 | Spector |
| 4,745,705 A | 5/1988 | Yamamoto et al. |
| 4,771,563 A | 9/1988 | Easley |
| 4,791,261 A | 12/1988 | Phinney et al. |
| 4,795,883 A | 1/1989 | Glucksman et al. |
| 4,803,341 A | 2/1989 | Barowski et al. |
| 4,830,791 A | 5/1989 | Muderlak et al. |
| 4,874,924 A | 10/1989 | Yamamoto et al. |
| 4,891,904 A | 1/1990 | Tabita |
| 4,933,525 A | 6/1990 | St. Phillips |
| 5,074,439 A | 12/1991 | Wilcox |
| 5,087,804 A | 2/1992 | McGaffigan |
| 5,095,647 A | 3/1992 | Zobele et al. |

(Continued)

*Primary Examiner*—Jeffery Hofsass
*Assistant Examiner*—George A. Bugg

(57) ABSTRACT

RFID tags attached to a product contain information regarding the product and communicate this information to a reader. This information can include the age of the product, the amount of product left and preparation or care instructions for the product. To record the age of a product, a timer is initiated in the RFID tag. Thereafter, the elapsed time on the timer can be read and displayed by the reader. For other products, the RFID tag can have contacts monitoring the level of remaining product. Once the contacts sense that the amount of product is low, this information can be transmitted and communicated by the reader. Preparation and care instructions are prerecorded on the tag. Instructions can also be communicated between a product and a base, such as a heater.

9 Claims, 7 Drawing Sheets

U.S. PATENT DOCUMENTS

| | | |
|---|---|---|
| 5,111,477 A | 5/1992 | Muderlak |
| 5,161,646 A | 11/1992 | Aurich et al. |
| 5,180,598 A | 1/1993 | Jozefowicz |
| 5,222,186 A | 6/1993 | Schimanski et al. |
| 5,229,751 A | 7/1993 | Chandler et al. |
| 5,272,298 A | 12/1993 | Taguchi et al. |
| 5,286,942 A | 2/1994 | McFadden et al. |
| 5,290,546 A | 3/1994 | Hasegawa et al. |
| 5,332,315 A | 7/1994 | Baker et al. |
| 5,335,509 A | 8/1994 | Namisniak et al. |
| 5,443,084 A | 8/1995 | Saleur |
| 5,449,117 A | 9/1995 | Muderlak et al. |
| 5,484,086 A | 1/1996 | Pu |
| 5,603,858 A | 2/1997 | Wyatt et al. |
| 5,644,866 A | 7/1997 | Katsuda et al. |
| 5,647,053 A | 7/1997 | Schroeder et al. |
| 5,697,577 A | 12/1997 | Ogden |
| 5,711,160 A | 1/1998 | Namisniak et al. |
| 5,798,694 A | 8/1998 | Reber et al. |
| 5,802,015 A | 9/1998 | Rothschild et al. |
| 5,829,278 A | 11/1998 | Koo |
| 5,857,620 A | 1/1999 | Nakoneczny |
| 5,883,582 A | 3/1999 | Bowers et al. |
| 5,884,808 A | 3/1999 | Muderlak et al. |
| 5,903,710 A | 5/1999 | Wefler et al. |
| 5,906,298 A | 5/1999 | Ward |
| 5,930,206 A | 7/1999 | Haas |
| 5,969,606 A | 10/1999 | Reber et al. |
| 5,996,889 A | 12/1999 | Fuchs et al. |
| 6,005,233 A | 12/1999 | Wyatt |
| 6,073,840 A * | 6/2000 | Marion ................. 235/381 |
| 6,078,728 A | 6/2000 | O'Rourke et al. |
| 6,085,026 A | 7/2000 | Hammons et al. |
| 6,098,879 A * | 8/2000 | Terranova .............. 235/384 |
| 6,116,505 A * | 9/2000 | Withrow ................. 235/381 |
| 6,141,496 A | 10/2000 | Sundberg et al. |
| 6,145,241 A | 11/2000 | Okuno |
| 6,191,401 B1 | 2/2001 | Salerno et al. |
| 6,217,213 B1 | 4/2001 | Curry et al. |
| 6,226,619 B1 | 5/2001 | Halperin et al. |
| 6,232,585 B1 | 5/2001 | Clothier et al. |
| 6,267,297 B1 | 7/2001 | Contadini et al. |
| 6,285,282 B1 | 9/2001 | Dorenbosch et al. |
| 6,293,044 B1 | 9/2001 | Feng |
| 6,294,997 B1 | 9/2001 | Paratore et al. |
| 6,314,971 B1 | 11/2001 | Schneider |
| 6,327,576 B1 | 12/2001 | Ogasawara |
| 6,335,685 B1 | 1/2002 | Schrott et al. |
| 6,343,491 B1 | 2/2002 | Jung |
| 6,350,972 B1 | 2/2002 | Wright et al. |
| 6,361,752 B1 | 3/2002 | Demarest et al. |
| 6,371,450 B1 | 4/2002 | Davis et al. |
| 6,453,687 B1 | 9/2002 | Sharwood et al. |
| 6,466,130 B1 | 10/2002 | VanHorn et al. |
| 6,483,434 B1 | 11/2002 | UmiKer |
| 6,615,881 B1 * | 9/2003 | Bartholomew et al. ........ 141/18 |
| 2001/0025349 A1 | 9/2001 | Sharwood et al. |
| 2001/0048030 A1 | 12/2001 | Sharwood et al. |
| 2001/0056376 A1 | 12/2001 | Walker et al. |
| 2002/0000092 A1 | 1/2002 | Sharood et al. |
| 2002/0016739 A1 | 2/2002 | Ogasawara |
| 2002/0026325 A1 | 2/2002 | Hirahara et al. |
| 2002/0047781 A1 | 4/2002 | Fallah |
| 2002/0139838 A1 | 10/2002 | Goodwin, III |
| 2002/0147649 A1 | 10/2002 | White |
| 2002/0154574 A1 | 10/2002 | Ector, Jr. et al. |
| 2002/0161652 A1 | 10/2002 | Paulin et al. |

* cited by examiner

PRODUCT DISPENSING CONTROLLED BY RFID TAGS

The instant application is based upon U.S. Provisional Patent Applications Ser. No. 60/427,934, filed Nov. 21, 2002, Ser. No. 60/430,101, filed Dec. 2, 2002, Ser. No. 60/430,102, filed Dec. 2, 2002 and Ser. No. 60/482,867 filed Jun. 27, 2003.

BACKGROUND OF THE INVENTION

Consumers often desire to know information regarding the many products in the household but the large number of consumer products makes keeping track of the condition of all products infeasible. Conditions that consumers often wish to know include age and time before replacement is necessary. At present, consumers often need to write a date on a product to keep track of its age of or continually check the amount remaining to estimate the time before replacement.

Many devices designed to dispense actives (also variously called dispensers) use refillable cartridges. Such devices include air fragrance dispensers. One problem encountered with such dispensers is that the cartridges are relatively long-lasting and when they finally do run out of product, the consumer is caught unprepared to replace the cartridge or they forget. Other products are used out of plain sight of the consumer. These devices include insect baits and traps. The consumer places them in hidden locations and may be unaware of whether they are being effective in controlling insects.

Consumers can place dates on products to know their age. Many freezer bags are provided with an area for marking the contents of the bag. To retrieve this information, the user needs to remove the bag from the freezer and read the information that has been imprinted on the bag and back compute the age from the date marked on the bag.

There is a need in the prior art for a single system able to track all products in a household and give information regarding the condition of the products, including age and amount of time before replacement.

It is an object of the invention to provide consumer items able to record and communicate condition of the product.

It is another object of the invention to provide products with RFID tags and a reader for storing information regarding the products and a reader for communicating this information to the consumer.

It is another object of the invention to provide a system for recording and communicating condition of a large number of items.

It is still another object of the invention to display information to the user by placing a reader in proximity to the item.

It is yet another object of the invention to use an RFID tag on a product to provide instructions to a recharger.

It is another object of the invention to provide consumers with information regarding products within the household.

These and other objects of the invention will become apparent to one of ordinary skill in the art after reviewing the disclosure of the invention.

SUMMARY OF THE INVENTION

RFID tags attached to a product contain information regarding the product and communicate this information to a reader. This information can include the age of the product, the amount of product left and preparation or care instructions for the product. To record the age of an product, a timer is initiated in the RFID reader once the RFID tag is recognized by the reader. Thereafter, the elapsed time on the timer can be read and displayed by the reader every time the RFID tag is passed in proximity to the reader. For other products, the RFID tag can have contacts monitoring the level of remaining product. Once the contacts sense that the amount of product is low, this information can be transmitted and communicated by the reader. Preparation and care instructions are prerecorded on the tag or within the reader depending on the type of tag (read only or read-write). Instructions can also be communicated between a product and a base, such as a heater.

A monitoring system alerts a consumer when a cartridge is near empty or when a device, such as an insect bait/trap, is being effective in controlling pests. An automated triggering and signaling device is applied to the dispenser or bait/trap to signal the consumer when the cartridge is near empty or the trap is being used. Simple electrical or electromechanical mechanisms trigger the signaling device and communicate the status to the consumer via a hand-held PDA or other capable device. When the designated time period of the refill is known, a countdown can be started when the refill is installed, and an automated status of near empty can be signaled after a predetermined time.

Another use for RFID tags is for initiating instructions within the reader when an item having the RFID tag is brought in proximity to reader. An item needing to be heated or recharged, for instance, has an RFID tag. When the item is placed in the heater or recharger, the reader on the heater or charger senses the proximity of the RFID tag and can initiate the appropriate reheating or recharging cycle, which can be initiated by the RFID tag. Conversely, the RFID tag can contain information on it to communicate to the reader and initiate a series of instructions or commands. The tag can be preprogrammed with specific instructions in the manufacturing process or can be programmable. In this case a read-write RFID tag would be used where instructions or data is written to the tag or previous instructions unwritten.

DETAILED DESCRIPTION OF THE INVENTION

RFID is a type of automatic identification technology, similar to bar code technology, except that RFID uses radio frequency instead of optical signals. The reader (or reader/writer) produces a low-level radio frequency magnetic field, typically either at 125 KHz or at 13.56 MHz. It must be noted that other frequencies can be used depending on the application. This magnetic field emanates from the reader (or reader/writer) by means of a transmitting antenna, typically in the form of a coil. Meanwhile, an RFID tag, typically including an antenna and an integrated surface, can be placed on any product.

The RFID system can be either read-only or read/write. Read-only systems, as their name suggests, permit the reader to receive information from the tag, but not vice-versa. Read/write systems, on the other hand, permit two-way communication between the tag and the reader/writer, and each of these components typically include an electronic memory for storing information received from the other component.

Figures 1A, 1B:
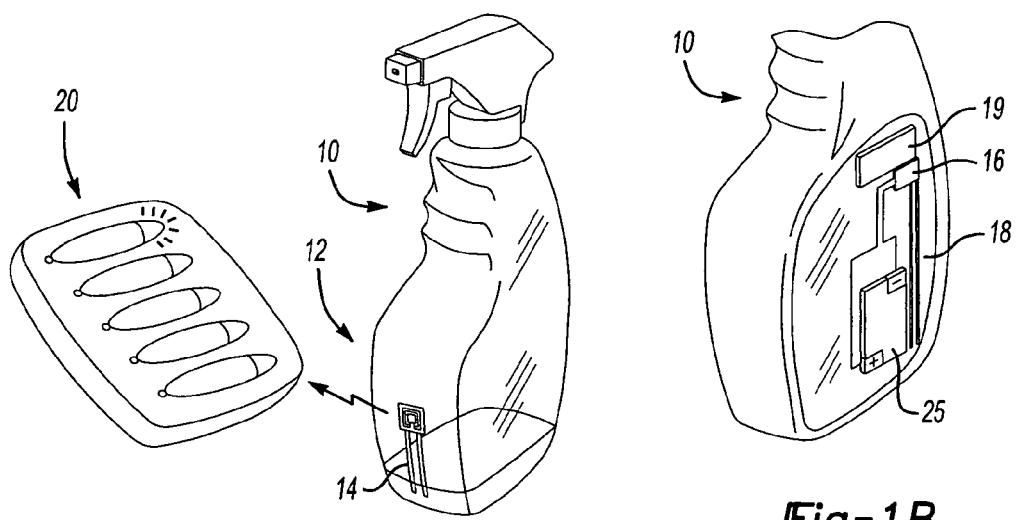
FIG. 1a depicts a trigger spray container having a near-empty indicator.
FIG. 1b depicts a trigger spray container having an alternative near-empty indicator.

FIG. 1a depicts a trigger spray container 10 having a near-empty indicator. The near-empty indicator consists of an RFID (radio frequency identification) tag 12 attached to the interior of the container. The RFID tag 12 has a pair of contacts 14 extending downwardly from the tag. When the contents of the container reach a level below the end of the contacts 14, an electrical circuit is broken, causing the RFID tag to send a signal to a monitoring unit 20. Power for the RFID tag to signal the reader is provided by a printed battery. The monitoring unit 20 has a series of LED lights, each LED light designating a particular product being monitored. In response to a signal from the RFID tag 12, the LED light will illuminate to indicate to the user or the consumer that the product will soon be in need of replacement. The signal may be audible.

FIG. 1b depicts an alternative near-empty indicator. The trigger spray container 10 has a flexible printed circuit board 16 mounted thereon with a pair of contacts extending downwardly inside of the container. In a manner similar to the embodiment shown in FIG. 1a, the reduction in level of product below the terminal ends of the contacts 18 causes the printed circuit board 16 to display a message on a display, such as e-paper attached to the container. Power for the printed circuit board and display is provided by a printed battery 25 adhered to the container exterior.

Figure 2:
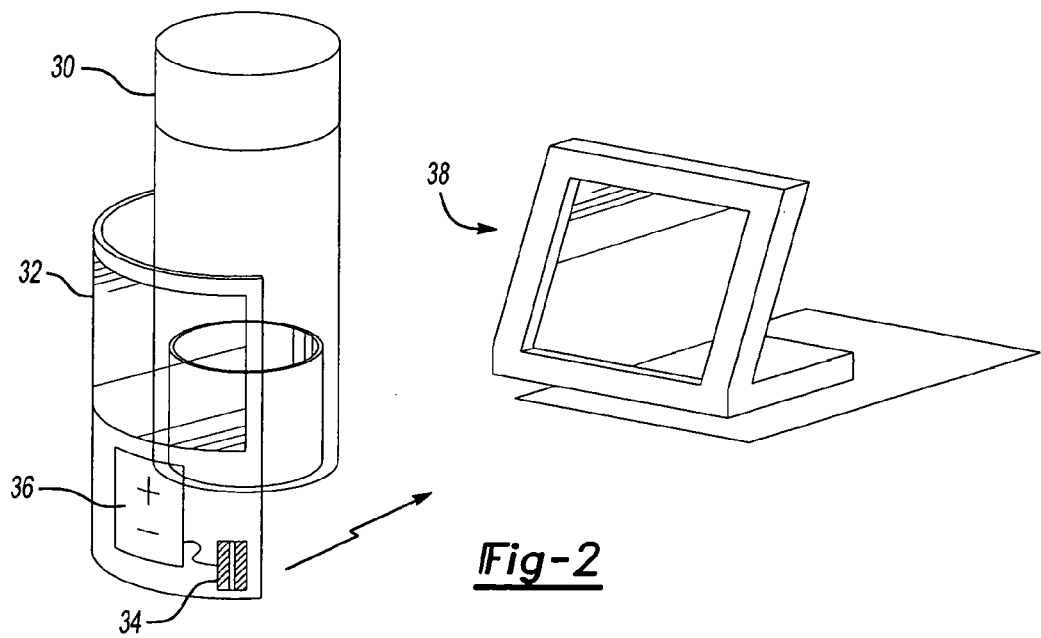
FIG. 2 depicts an aerosol can having a functional label incorporating a near-empty indicator.

FIG. 2 depicts the incorporation of a near-empty indicator on an aerosol can 30. A functional label 32 is attached to the can. The functional label 32 includes a refill sensor 34. When the contents of the container fall below a certain level, the refill sensor 34 sends a signal to a base monitor 38. The base monitor 38 is able to display a printed message to the user indicating the need to replace the product in the very near future. The refill sensor is provided power by a printable battery 36 incorporated into the label.

Figure 3:
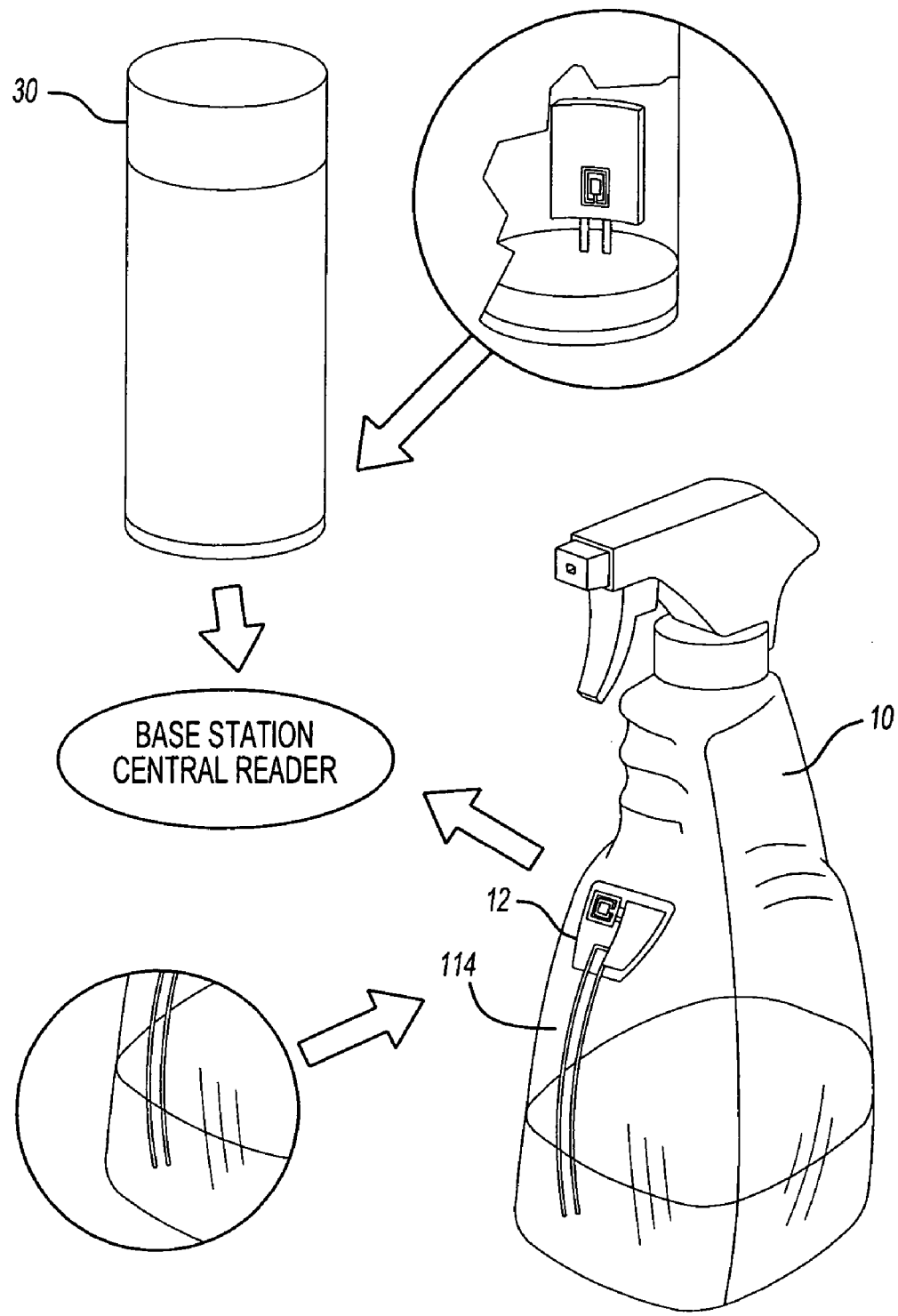
FIG. 3 depicts containers having near-empty indicators communicating with a central base station.

FIG. 3 depicts the ability for a plurality of containers to interact with a single central base station. The trigger spray container 10 has an RFID tag 12. In this instance, the contacts 114 are molded into the container. The spray can 30 has a near-empty indicator attached to the interior of the can during manufacturing. Both of these containers communicate with a base monitor to alert the consumer that the level of product remaining in either respective container has reached a certain, predetermined low level.

Figure 4A:
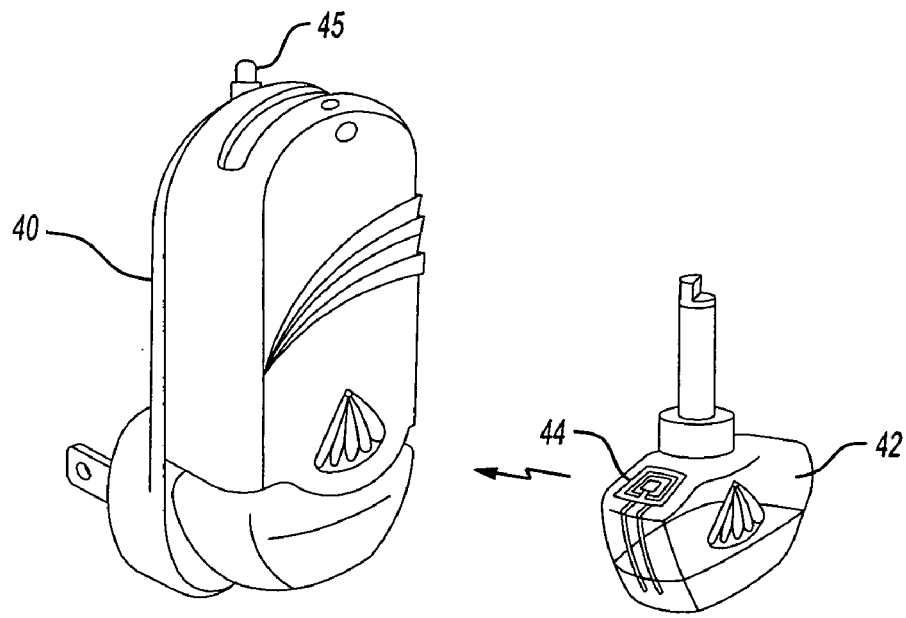
FIG. 4a depicts a dispenser having an active refill incorporating a near-empty indicator.

FIG. 4a shows a plug-in appliance for discharging fragrances, insecticides or similar actives. The actives are contained in a replaceable cartridge 42 received by the plug-in appliance 40 and having an RFID tag 44. Contacts from the RFID tag extend downwardly from the tag and a reduction in the amount of liquid or gel contained in the refill breaks the electrical circuit when the product falls below a certain level. The signal sent from the RFID tag alerts the consumer of this condition. In this instance, the RFID tag causes indicator light 45 at the top of the plug-in appliance to illuminate. The plug-in appliance can also have an audible message in response to a signal from the RFID tag. An additional embodiment would have the RFID tag signal a timer in the heater 40 to start. When the timer reaches a set time limit a signal is activated indicating that the refill is near empty.

Figure 4B:
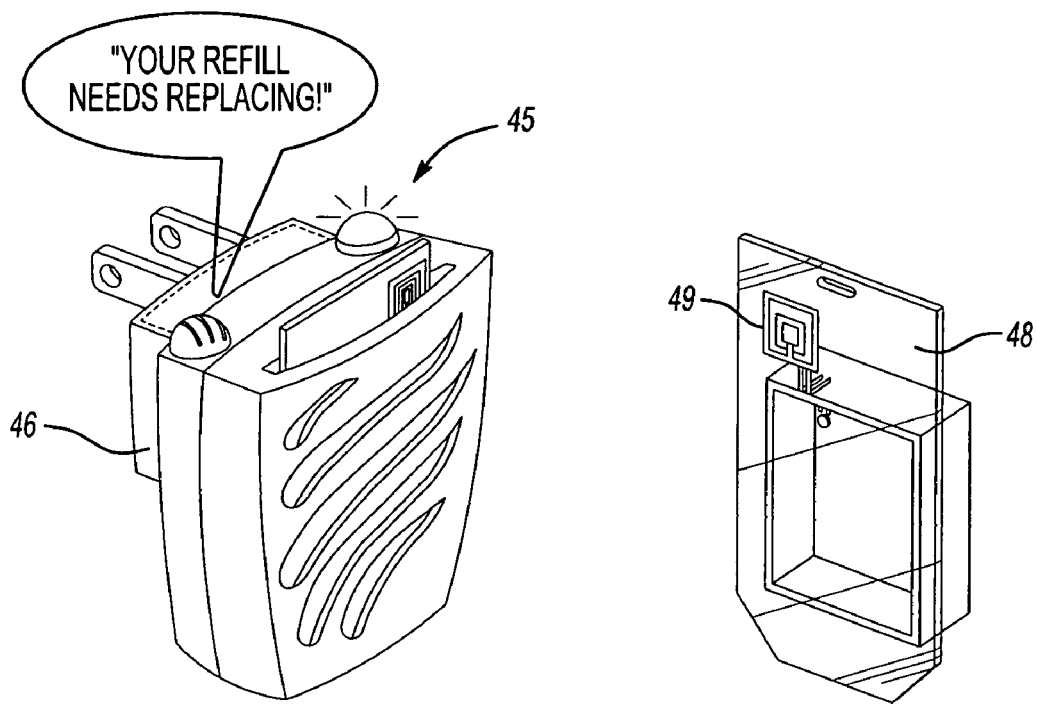
FIG. 4b shows a dispenser having an alternative refill incorporating a near-empty indicator.

FIG. 4b shows a similar plug-in appliance 46 having a different type of cartridge 48 incorporating an RFID tag 49 having contacts extending downwardly into the container that break an electrical circuit when the product falls below a certain level. In the same manner, after such an event occurs, the RFID tag causes an indicator light 45 to illuminate. An additional embodiment would have the RFID tag signal a timer in the heater 46 to start. When the timer reaches a set time limit a signal is activated indicating that the refill is near empty.

Figure 5:
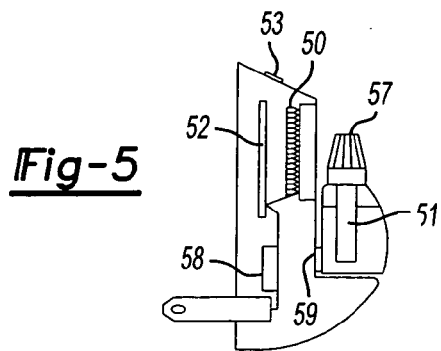
FIG. 5 depicts a bottle having an RFID tag that mates with a holder.

Some actives and other products are not plugged directly into an outlet but are heated by a base unit, or charging device. FIG. 5 shows a charging device comprising a coil 50 for generator a magnetic field, a control device 52 such as a circuit board for controlling the coil to selectively generate the magnetic field, a switch 53 for manually activating the charging device to generate the magnetic field, a heatable element 51 and a detection device 58 such as a reader writer. The heat storage unit has a radio frequency identification device 59 storing information about the heat storage unit. The detection device of the charging device reads the information stored by the RFID tag on the heat storage unit. The charging device is automatically activated to generate the magnetic field when the heat storage unit is placed in proximity to the charging device. With a heat storage unit and charging device, a proximity between tag and reader of 0.1 to six inches is preferred.

The RFID reader/writer 58 is connected to control device 52. The heat storage unit has RFID tag 59 including an antenna. Preferably, the RFID tag is affixed to the outside of the heat storage unit or formed integrally with the heat storage unit. The tag signals reader/writer 58 when an appropriate heat storage unit is placed in proximity to the charging device causing control dervice 52 to activate coil 50. The heatable element 51 generates heat in the presence of the generated magnetic field. Any device not having an RFID tag will not activate the charging device.

More than signaling the proximity of a container to activate the charger, in a more advanced embodiment, RFID tag 59 can transmit information to reader/writer 58 regarding preferred heating conditions for the particular heat storage unit. This can include both heating durations and peak temperatures. Additionally, the RFID tag can be used to transmit information to the reader/writer 58 regarding the product placed in the charger element. The reader recognizes the unique signature of the tag and accesses a stored regimen corresponding to that signature. Or the tag may store the heating regimen and transmit this information to the reader.

In this manner, a single recharger can be used for a variety of different products such as different fragrances, insecticides, sanitizers, odor counteractant, liquid cleaning solution, shaving cream, lotion, or dispensing devices each having a different heating regimen.

Optionally, the RFID tag could have a writable electronic memory. The electronic memory contains stored information which may be updated by transmissions from the reader/writer 58, including the heating history of the heat storage unit. The heating history of the bottle can be transmitted to the charge so that the charging device raises the peak temperature each time the charging device cycles on. This incrementally increases the evaporation rate of a fragrance to overcome any possible desensitizing problem. Transmitting the history of the bottle, a signal may be sent to the user to replace the bottle with a new one based on the known duration of the contents of the bottle.

A real time clock connected to the control circuit can keep track of how long a particular heat storage unit has been heated and how recently. The control circuit therefore prevents overheating of the heat storage unit in such instances as when the heat storage unit has been recently heated and again plugged into the charging device. The RFID tag may also have a temperature sensor detecting the temperature of the heat storage unit to prevent overheating.

Figure 5A:
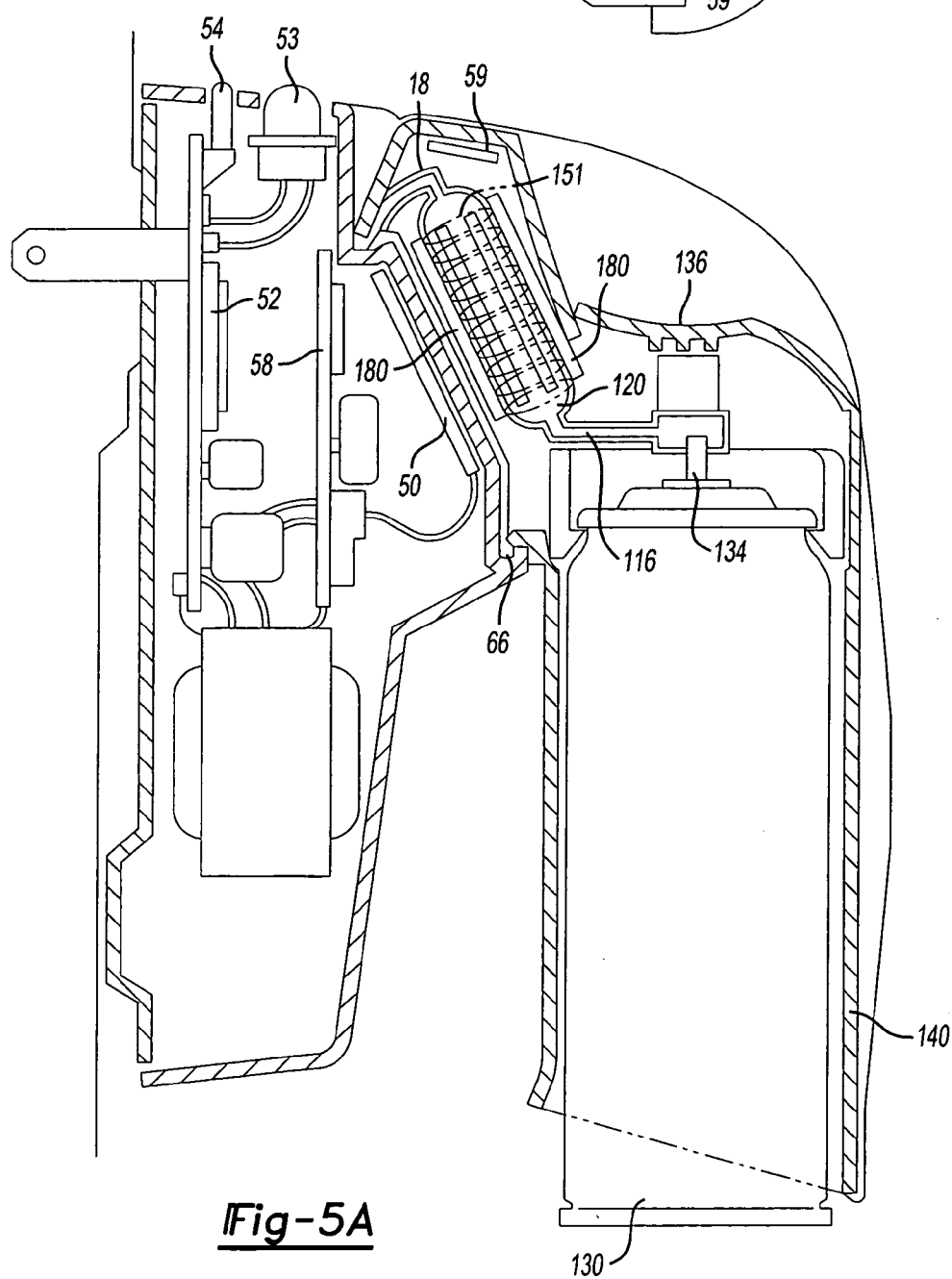
FIG. 5a depicts a heater and container for flowable products.

In addition to heating volatiles, a bottle containing flowable products may be placed in the charging device. The RFID tag on the bottle transmits information to the charging unit that a bottle has been placed in proximity and, optionally, to transmit information regarding the heating regimen of the particular flowable product. A charger and container for heating flowable consumer products is shown in FIG. 5a. Similar to the system of FIG. 5, the charger has a control device 52, a detection device, reader/writer 58, and a magnetic field generator 50. The charger also has a manual switch 53 and indicator light 54.

The container mating with the charger has a housing 140 accommodating a pressurized container 130 having a valve stem 134. The valve stem leads to the inlet 116 of a reservoir 120. The reservoir is sized to hold one to five doses of the flowable product dispensed by the pressurized container by an actuator 136. The reservoir is surrounded by a heatable element 151 generating heat in the presence of the generated magnetic field and a heat retentive body 180. An RFID tag 59 controls the heating of the heating element. Similar to the embodiment of FIG. 5, the tag may simply signal the presence of a suitable container to initiate the magnetic field generator, or initiate a specific heating regimen by accessing a regimen stored in the charger or transmitting the regimen to the charger. As is true with both chargers shown in FIGS. 5 and 5a, any type of conventional heating, such as resistive heating, can be used in place of magnetic heating.

Figure 6:
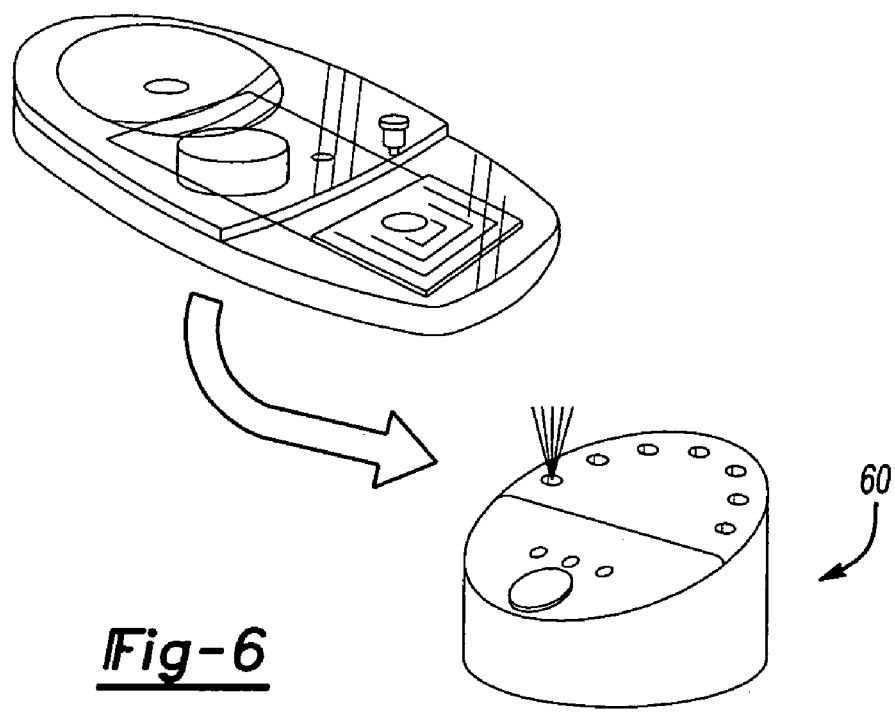
FIG. 6 depicts a multiple fragrance dispenser responsive to a key fob controller.

FIG. 6 depicts a fragrance dispenser 60 activated by a controller. The controller can be a key fob 62 having a printed circuit board and RFID chip to signal the dispenser. The signals can be controlled by the user by a button to allow the user dispense the fragrance in the dispenser.

Figure 7:
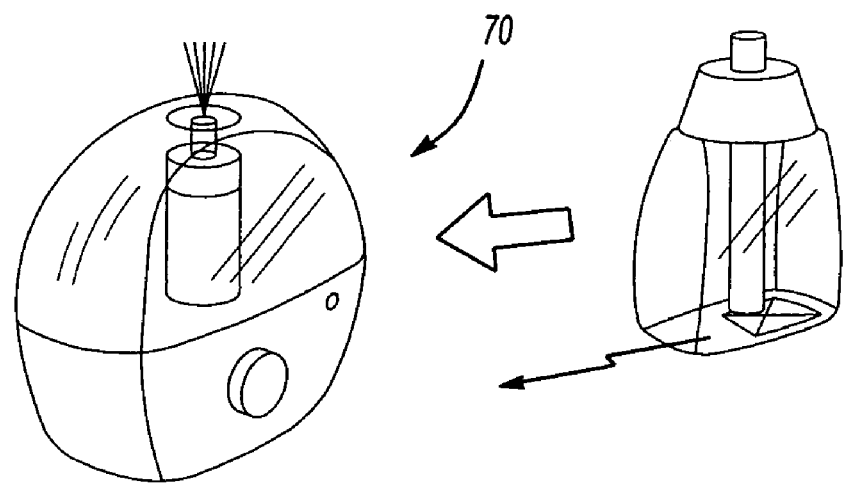
FIG. 7 depicts a fragrance dispenser responsive to a light sequence.

FIG. 7 discloses a multi-fragrance dispenser 70 responsive to controls to dispense a particular fragrance. Each fragrance has a corresponding and specific RFID tag. The fragrance to be dispensed in response to specific signals is programmed via a RFID chip. In addition to dispensing a fragrance, the controller causes the RFID chip to illuminate various colored lights, such as LEDs. The dispenser has several LEDs of various colors which illuminate, singly or in combinations. In this manner, visual stimulation is provided to accompany the olfactory stimulation. In addition or place of visual signals, specific audio signals can be generated along with the dispensing of a particular fragrance.

Figure 8:
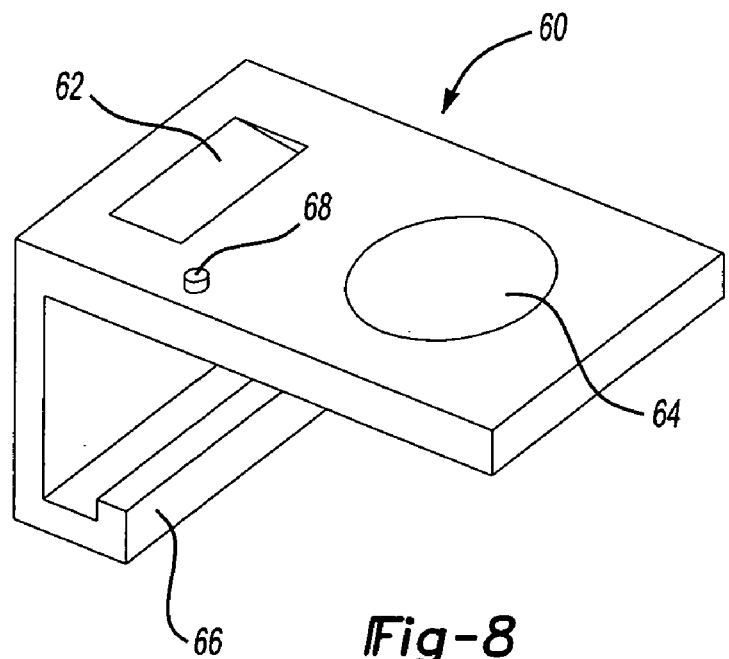
FIG. 8 depicts a reader for an RFID tag recording elapsed time.

FIG. 8 depicts a reader 60 having a display 62 for visually displaying information transmitted from an RFID tag, such as age and time. In addition, the reader may be provided with a speaker to audibly transmit information. The display has a target area 64 indicating the position of the antenna on the circuit board housed within the reader for receiving information from the RFID tag. A hook 66 may be provided on the reader for allowing the reader to hang from a refrigerator door or other similar device. In place of a hook, other mounting devices, such as magnets, adhesive or Velcro may be used. The reader has a start button 68 used to initialize a timer relating to the RFID tag and reset the timer, if desired.

Figure 9:
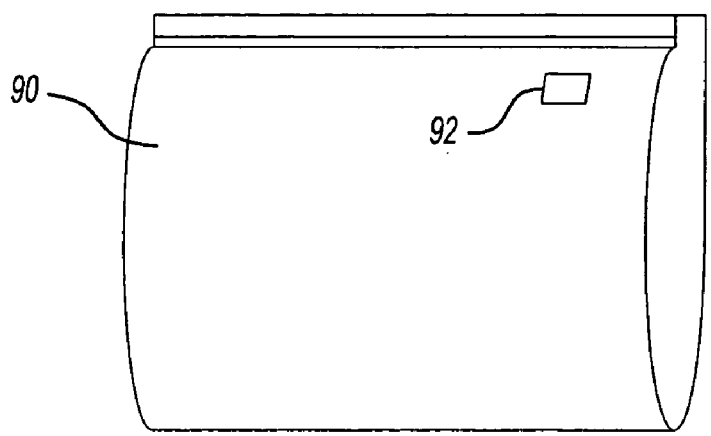
FIG. 9 depicts bags incorporating an RFID tag.
Figure 10:
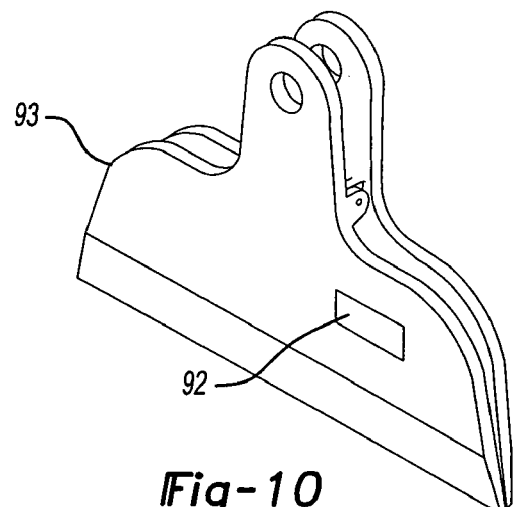
FIG. 10 depicts a clip having an RFID tag.

RFID tags can be attached to rigid or flexible containers, such as bags. FIG. 9 depicts a bag 90 having an RFID tag 92. The RFID tag 92 is initialized by the depression of a start button 68 on the reader 60. Once initialized by a particular RFID tag, the timing sequence begins recording elapsed time since initialization. With a single reader, a plurality of RFID tags on reclosable bags or any other types of containers can be monitored. The tags may be applied by the manufacturer or may be sold separately to be applied by the consumer. If applied by the consumer, the RFID tags may be disposable or reusable with limited number of uses and be attached on multiple bags or containers. In this instance, when the RFID tag is switched from one container to another, it is reinitialized by the reader to again, monitor elapsed time since initialization. A variety of attachment means can be used to attach and remove the reusable version of the tag. In addition to containers, such as bags, RFID tags 92 can be applied to clips 93 used to reclose bags, as seen in FIG. 10. After initially opening the bag, the clip 93 is used to reclose or reseal the bag with the RFID tag being initialized. This gives the consumer information about elapsed time since the bag was opened. The clip, being reusable, has an RFID tag reset each time it is applied to a bag for the first time. If the tag is disposable or has a limited number of uses, the clip can have a provision to nest the tag in a pocket or recess.

The use of RFID tags to monitor elapsed time can be used for a whole host of applications. Any device needing routine maintenance can have an RFID tag to record elapsed time since the last maintenance cycle. Common devices which require routine, timed maintenance include HVAC systems, horticultural items and various items on automobiles.

Figure 11:
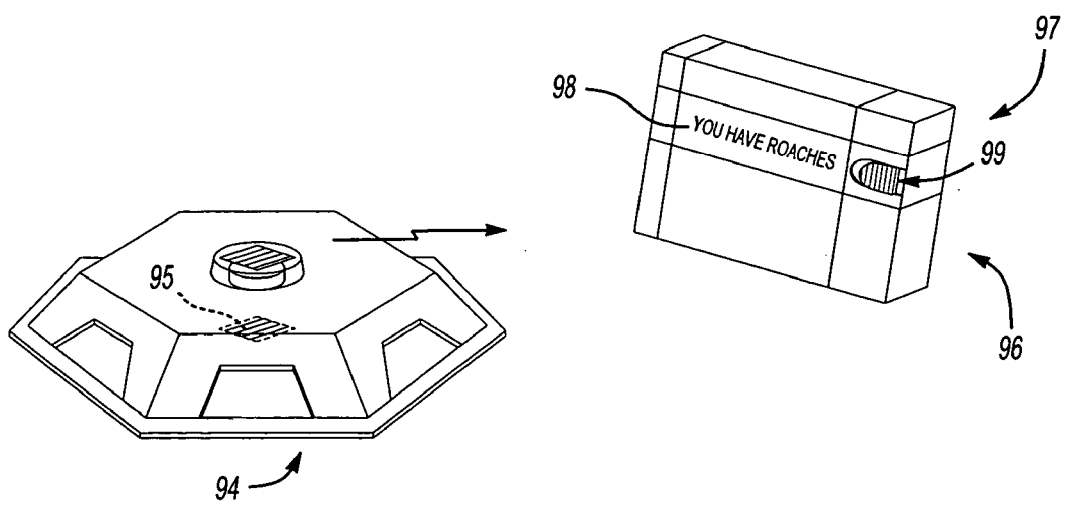
FIG. 11 depicts an insect trap incorporating an effectiveness indicator.

FIG. 11 depicts an insect trap 94 having an RFID tag 95 measuring insect presence. Activity of insects activates the RFID tag and sends a signal to a monitor 96. The monitor may have an indicator light 97 or LCD readout 98 to alert the consumer that the trap has been activated by the presence of insects. A reset button 99 adds to the effectiveness of the monitor in assessing the effectiveness of the trap. The insect can trigger a low power electrical trigger to signal the device. Alternatively, pheromone sensors can be used to trigger insect presence.

Besides elapsed time, prerecorded information can be placed on an RFID tag appropriate for the item to which the tag is attached. For example, such an application is clothes. Clothes may be provided with tags having care instructions. Whether dry cleaning is necessary, the best method for removing stains and the type of wash cycle to allow sorting of laundry into like articles of clothing for washing purposes, can be placed on an RFID tag. As an educational tool, tags may be provided with information allowing children to match clothes together. If the tags are applied by the manufacturer, the tags can be used to store information regarding a sweepstakes or other promotional activity. Also, the tags can be used as a simple means to track inventory of food in a household.

Other types of information that may be stored on RFID tags is cooking instructions. The packaging of food items may contain RFID tags with cooking instructions. By bringing the package within proximity of a reader, the RFID tag can initiate an audio message providing cooking instructions, or a visual display on a screen.

Because a reader senses proximity of an RFID tag, tags may be incorporated into items such as keys, pet collars, or any other item that is often lost. Using the portable reader, the user can receive an audio or visual signal through the reader display whenever the reader comes within proximity of an RFID tag. At present, a proximity of two meters is envisioned. However, greater read distances are feasible depending on power requirements. The use of active tags, those having their own power source, enables greater distances. However, one of ordinary skill in the art is able to adjust proximity requirements to suit the particular application.

The RFID tag may be made small enough that the tag may be added to bait and ingested by rodents or other animals. Once ingested, the tag may be tracked by using the reader to indicate the proximity of the tag.

Although specific components, materials, configurations, arrangements, etc. have been shown and described with reference to several preferred embodiments, our invention is not limited to these specific embodiments. One of ordinary skill in the art will realize that various modifications and variations are possible within the spirit and scope of our invention which is intended to be limited in scope only by the accompanying claims.

What is claimed is:

1. A volatile dispensing system, comprising:
   at least one container having a volatile,
   a holder retaining said at least one container, and
   an RFID tag on said at least one container and a reader on said holder controlling dispensing of said volatile into the immediate environment.

2. The system of claim 1, wherein said volatile is a air freshener.

3. The system of claim 1, wherein said volatile is a fragrance.

4. The system of claim 1, wherein said at least one container is a plurality of containers, each container having an RFID tag, and further comprising a controller, said controller controlling which one of said plurality of containers is dispensed.

5. The system of claim 1, wherein said holder is a heater, and said RFID tag controls dispensing by initiating heating of said at least one container.

6. The system of claim 5, wherein said RFID tag controls dispensing by communicating heating instructions to said heater.

7. A volatile dispensing system, comprising:
   at least one container having a volatile,
   a holder releasably retaining said at least one container, and
   an RFID tag on said at least one container controlling dispensing of said volatile into the immediate environment.

8. The system of claim 7, wherein said RFID tag stores the usage history of said at least one container.

9. The system of claim 7, wherein said holder is a heater and said RFID tag stores heating regimen information for said at least one container.

* * * * *